United States Patent [19]

Myers, Jr. et al.

[11] Patent Number: 4,708,923
[45] Date of Patent: Nov. 24, 1987

[54] CROSSLINKED VINYL POLYMER PARTICLES AND ELECTROGRAPHIC ELEMENTS AND LIQUID DEVELOPERS CONTAINING SUCH PARTICLES

[75] Inventors: Drewfus Y. Myers, Jr.; Peter S. Alexandrovich; Glenn T. Pearce; Domenic Santilli; Chandrasekha Sreekumar; Martin A. Berwick; Donald A. Upson; William K. Goebel, all of Rochester, N.Y.

[73] Assignee: Eastman Kodak Company, Rochester, N.Y.

[21] Appl. No.: 858,464

[22] Filed: Apr. 30, 1986

[51] Int. Cl.⁴ .............................................. G03G 9/18
[52] U.S. Cl. ..................................... 430/112; 430/114; 526/329.1
[58] Field of Search ............... 430/109, 111, 112, 114; 521/29; 524/904; 525/934; 526/909, 329.1

[56] References Cited

U.S. PATENT DOCUMENTS

| | | | |
|---|---|---|---|
| Re. 31,072 | 11/1982 | Jadwin et al. | 430/99 |
| 2,422,371 | 7/1947 | Schoenfeld | 526/329.1 |
| 2,744,099 | 5/1956 | Mitchell | 526/329.1 |
| 3,198,854 | 8/1965 | Warner | 526/329.1 |
| 3,285,887 | 10/1966 | de Vries | 260/90.5 |
| 3,313,733 | 4/1967 | de Vries | 252/57 |
| 3,356,659 | 12/1967 | Hagemeyer | 526/329.1 |
| 3,755,237 | 8/1973 | Isaacs | 526/329.1 |
| 3,788,995 | 1/1974 | Stahly et al. | 252/62.1 |
| 3,833,404 | 9/1974 | Sperling et al. | 117/63 |
| 3,849,165 | 11/1974 | Stahly et al. | 117/37 LE |
| 3,941,898 | 3/1976 | Sadamatsu et al. | 427/18 |
| 4,052,325 | 10/1977 | Santilli | 252/62.1 L |
| 4,164,522 | 8/1979 | Gibbs | 525/305 |
| 4,171,275 | 10/1979 | Merrill et al. | 252/62.1 L |
| 4,199,363 | 4/1980 | Chen | 430/512 |
| 4,202,785 | 5/1980 | Merrill et al. | 430/106 |
| 4,268,549 | 5/1981 | Fink | 526/329.1 |
| 4,306,009 | 12/1981 | Veillette et al. | 430/115 |
| 4,560,714 | 12/1985 | Gajria et al. | 523/409 |

FOREIGN PATENT DOCUMENTS

| | | | |
|---|---|---|---|
| 0022982 | 1/1981 | European Pat. Off. | 526/321.9 |
| 0185431 | 6/1986 | European Pat. Off. | 526/323.2 |

Primary Examiner—John L. Goodrow
Attorney, Agent, or Firm—David F. Janci

[57] ABSTRACT

The invention provides new crosslinked vinyl polymer particles, new coating compositions containing such particles, new liquid electrographic developers containing such particles, new electrographic elements containing one or more layers comprising such particles, and new electrographic records containing toner images and/or layers comprising such particles.

The polymeric particles of the invention are characterized in that each particle has an average diameter less than one micrometer and comprises a crosslinked vinyl addition copolymer obtainable by aqueous emulsion polymerization of a mixture of monomers wherein:

1.5–15 percent by weight of the mixture of monomers comprises polyfunctional vinyl addition-polymerizable monomers in order to form crosslinking structural units in the copolymer;

85–98.5 percent by weight of the mixture of monomers comprises monofunctional vinyl addition-polymerizable monomers selected such that:

A. 0–98.5 percent by weight of the mixture of monomers comprises monofunctional monomers, the homopolymers of which would be insoluble in but swellable by an isoparaffinic hydrocarbon liquid;

B. from 0 to less than 85 percent by weight of the mixture of monomers comprises monofunctional, monomers, the homopolymers of which would be soluble in the isoparaffinic hydrocarbon liquid; and C. 0–60 percent by weight of the mixture of monomers comprises monofunctional monomers, the homopolymers of which would be insoluble in and not swellable by the isoparrafinic hydrocarbon liquid;

with the provisos that:

I. if more than 0 percent by weight of the mixture of monomers comprises the monomers of part C., above, than more than 0 percent by weight of the mixture of monomers comprises the monomers of part B., above;

II. if more than 9 percent by weight of the mixture of monomers comprises the monomers of part C., above, then less than 10 percent by weight of the mixture of monomers comprises the monomers of part A., above; and III. all of the polyfunctional and monofunctional monomers and amounts thereof are selected such that the copolymer would be insoluble in the isoparaffinic hydrocarbon liquid but would be swellable by that liquid.

27 Claims, No Drawings

CROSSLINKED VINYL POLYMER PARTICLES AND ELECTROGRAPHIC ELEMENTS AND LIQUID DEVELOPERS CONTAINING SUCH PARTICLES

FIELD OF THE INVENTION

This invention relates to particles comprising crosslinked vinyl addition copolymers and to electrographic elements and liquid electrographic developers containing such particles. More particularly, the particles are submicronic in size and are fashioned to be insoluble, swellable and dispersible in electrically insulating organic liquids of choice, yet still have a degree of crosslinking high enough to provide very good resistance to solvent attack and deformation or other degradation. The particles can be prepared by aqueous emulsion polymerization and can be used as toner binders in liquid electrographic developers or as film-forming materials for various layers of electrographic elements and records.

BACKGROUND

In electrography an image comprising an electrostatic field pattern, usually of non-uniform strength, (also referred to as an electrostatic latent image) is formed on an insulative surface of an electrographic element by any of various methods. For example, the electrostatic latent image may be formed electrophotographically (i.e., by imagewise photo-induced dissipation of the strength of portions of an electrostatic field of uniform strength previously formed on a surface of an electrophotographic element comprising a photoconductive layer and an electrically conductive substrate), or it may be formed by dielectric recording (i.e., by direct electrical formation of an electrostatic field pattern on a surface of a dielectric material). Typically, the electrostatic latent image is then developed into a toner image by contacting the latent image with an electrographic developer. If desired, the latent image can be transferred to another surface before development.

Where high resolution toner images are desired, development is typically carried out electrophoretically by contacting the latent image with a liquid electrographic developer comprising particulate toner material of very small size (e.g., less than 1 micrometer) dispersed in an electrically insulating organic carrier liquid, such as an isoparaffinic hydrocarbon liquid. The toner particles migrate to and deposit on areas of the insulative surface having relatively high or low field strength, depending upon the polarity of the electrostatic charge of the toner material and the polarity and strength of an external electrical field usually applied across the electrographic developer and element during the development process. An imagewise deposit of toner particles is thus formed on the insulative surface and can be fixed in place on the surface by application of heat or other known methods (depending upon the nature of the toner particles to be fixed) or can be transferred in some cases to another surface to which it then can be similarly fixed.

Many types of toner materials are known to be useful in liquid electrographic developers. Such toners comprise at least a binder component (often in combination with a colorant material), in particulate form. A number of properties can be identified, which would be highly desirable to have in optimum toner binder particles. Optimum toner binder particles would be of very small size (each particle having an average diameter less than one micrometer) to enable formation of colloidal or near-colloidal dispersions and to enable high resolution imaging and capability of forming void-free smooth-surfaced deposits having good transparency, toughness, and resistance to abrasion or other degradation by solvents or other dry or oily materials. Optimum toner binder particles would be insoluble in but swellable by and, thus, dispersible in, electrically insulating organic carrier liquids of choice (e.g., isoparaffinic hydrocarbon liquids) and would exhibit good dispersion stability therein, either by themselves or with the aid of dispersing agents and stabilizers that can be dispersed or dissolved in the liquids. Optimum toner binder particles would comprise thermoplastic polymeric materials having relatively high molecular weight (e.g., at least $10^6$ g/mole) and a relatively low glass transition temperature (Tg) when in contact with and swollen by the carrier liquid, thus exhibiting an amorphous, yet still particulate, character that would enable them to bind themselves and other desirable developer addenda into seemingly continuous film deposits on insulative surfaces, either at ambient temperatures or with minimal application of heat; yet the particles would have a relatively higher Tg in the absence of the carrier liquid, so that when the carrier liquid is evaporated from deposits of the particles on a surface, and the deposits are allowed to cool, they will not flow from their original areas of deposition at room temperature; they will be fixed in place and be tough and abrasion-resistant. Optimum polymeric toner binder particles would also contain a significant degree of crosslinking in the polymeric material in order to further enhance structural integrity and solvent-resistance of the resultant deposits.

It will be readily appreciated, however, that fashioning such optimum toner binder particles having a desirable degree of all of the above-noted properties would be a very difficult task, especially since means for imparting some of these properties to the particles often work at cross-purposes with means for imparting other of these properties.

For example, the desire to make polymeric particles satisfactorily dispersible in certain carrier liquids by making them insoluble in, but swellable by, the carrier liquids, has led some workers in the prior art to fashion certain copolymers derived from a mixture of monomers. Some of the monomers in such a mixture may be chosen for their ability to form homopolymers that would be soluble or at least swellable in the carrier liquid of choice, in order to impart swellability to the copolymer intended to be produced. Other of the monomers in the mixture may be chosen for their ability to form homopolymers that would be insoluble in the carrier liquid, in order to enable the intended copolymeric particles to exhibit the necessary property of insolubility in the carrier liquid. This is the approach disclosed, for example, in U.S. Pat. Nos. 3,788,995; 3,849,165; and 4,171,275. The balancing of amounts of solubilizing and insolubilizing monomers, however, can affect more than just the dispersibility of the particles. For example, while it may be fairly simple to create particles that are insoluble, swellable, and dispersible by using a relatively high ratio of solubilizing to insolubilizing monomers, the relatively large amount of solubilizing monomers may produce a copolymer that is disadvantageously susceptible to attack by solvents that it may come into contact with during use; or the copolymer may be particularly susceptible to oily abrasion (e.g., degradation by rubbing contact with human skin and oils). The U.S. Patent disclosures noted above do not address these potential problems. Those disclosures also do not suggest that the copolymers should have any crosslinking to improve structural integrity and solvent resistance. Crosslinking could inherently upset the property balance needed to achieve good dispersibility (increased crosslinking generally leading to decreased dispersibility). Furthermore, those disclosures teach that the copolymers should be produced in bulk by techniques such as solution polymerization, whereupon inefficient and time-consuming milling procedures are then required to achieve the desired submicrometer particle sizes. Optimum toner binder particles would be capable of being synthesized initially in the desired particle sizes, thus avoiding the need for such milling procedures.

Another approach to obtaining polymeric toner binder particles for liquid electrographic developers is disclosed in U.S. Pat. No. 4,306,009. It involves use of so-called "gelatex" particles comprising interpenetrating networks of two different polymers that are physically entangled but not chemically bonded to each other. Requirements of insolubility, swellability, and dispersibility in carrier liquids are met by fashioning one of the polymers (called a latex) to be insoluble in the carrier liquid and fashioning the other polymer (called a gel) to be soluble or "on the borderline of solubility" in the carrier.

All specific examples of the gel polymers in that patent are fashioned from mixtures of monomers that contain a very high percentage (i.e., greater than 89 percent by weight) of solubilizing monomers. One or both of the polymers can be a copolymer and can contain trace amounts of crosslinking in order to achieve permanence of the physical entanglement. It is said that the gel polymer portion of the particles can be produced from a mix of monomers of which up to 1.2 percent by weight can comprise crosslinking vinyl monomers. Higher amounts of crosslinking apparently would detract from the gel polymer's solubilizing function and ability to be penetrated by the monomers of the insoluble latex polymer during its synthesis within the gel polymer network. The preparation of those gelatex materials involves a fairly lengthy procedure of synthesizing the gel polymer and then the latex polymer entangled within it and apparently produces a bulk material, which must then be milled to desired size. Because there is some small but significant degree of crosslinking in the gel polymer portion of the gelatex it would be very difficult to mill the material so that the sizes of all particles would be less than one micrometer (and would be even more difficult to do so if a greater degree of crosslinking were used); the patent states that the final gelatex particles have a mix of sizes distributed from about 0.1 to about 1.5 micrometers. Thus, thse gelatex particles are not the optimum toner binder particles noted previously herein as desirable, because they have a larger than optimum distribution of sizes, their degree of crosslinking is limited, they must be fashioned from more than one polymer, their gel polymer portion has very high solubilizing monomer content, and they must be milled to final size.

It is, therefore, evident that there is a need to provide polymeric particles that could serve as optimum toner binder particles having all of the desirable characteristics noted above. The present invention does provide such particles.

SUMMARY OF THE INVENTION

The invention provides new crosslinked vinyl polymer particles, new coating compositions containing such particles, new liquid electrographic developers containing such particles, new electrographic elements containing one or more layers comprising such particles, and new electrographic records containing toner images and/or layers comprising such particles.

The polymeric particles of the invention are characterized in that each particle has an average diameter less than one micrometer and comprises a crosslinked vinyl addition copolymer obtainable by aqueous emulsion polymerization of a mixture of monomers wherein:

1.5–15 percent by weight of the mixture of monomers comprises polyfunctional vinyl addition-polymerizable monomers in order to form crosslinking structural units in the copolymer;

85–98.5 percent by weight of the mixture of monomers comprises monofunctional vinyl addition-polymerizable monomers selected such that:

A. 0–98.5 percent by weight of the mixture of monomers comprises monofunctional monomers, the homopolymers of which would be insoluble in but swellable by an isoparaffinic hydrocarbon liquid;

B. From 0 to less than 85 percent by weight of the mixture of monomers comprises monofunctional monomers, the homopolymers of which would be soluble in the isoparaffinic hydrocarbon liquid; and C. 0–60 percent by weight of the mixture of monomers comprises monofunctional monomers, the homopolymers of which would be insoluble in and not swellable by the isoparaffinic hydrocarbon liquid;

with the provisos that:

I. if more than 0 percent by weight of the mixture of monomers comprises the monomers of part C., above, then more than 0 percent by weight of the mixture of monomers comprises the monomers of part B., above;

II. if more than 9 percent by weight of the mixture of monomers comprises the monomers of part C., above, then less than 10 percent by weight of the mixture of monomers comprises the monomers of part A., above; and III. all of the polyfunctional and monofunctional monomers and amounts thereof are selected such that the copolymer would be insoluble in the isoparaffinic hydrocarbon liquid but would be swellable by that liquid.

In the definition of polymeric particles of the invention above, and throughout this specification, unless otherwise stated, the terms, "soluble", "insoluble" and "swellable" should be interpreted as follows. A material is soluble in a medium, if a single homogeneous phase is formed when the material is mixed with an excess amount of the medium at 25° C. A material is insoluble in a medium, if a single homogeneous phase is not formed when the material is mixed with an excess amount of the medium at 25° C. A polymeric material is swellable by a medium, if, when mixed with an excess amount of the medium at 25° C., the material absorbs enough of the medium such that the glass transition temperature (Tg) of the material plus absorbed medium is at least 10° C. lower than the Tg of the material itself.

Tg is determined by any of the methods well known in the art.

A coating composition in accordance with the invention comprises the polymeric particles of the invention, as defined above, dispersed in a liquid.

A liquid electrographic developer provided by the invention comprises a dispersion of the polymeric particles of the invention in an electrically insulating organic liquid.

One form of an electrographic element provided by the invention comprises an electrically conductive substrate, a photoconductive layer, and a coating on the photoconductive layer comprising the polymeric particles of the invention.

Another form of an electrographic element provided by the invention comprises an electrically conductive substrate, a photoconductive layer, and a barrier layer comprising the polymeric particles of the invention situated between the conductive substrate and the photoconductive layer.

One form of an electrographic record provided by the invention comprises an electrographic toner image on a substrate, wherein the toner image comprises the polymeric particles of the invention.

Another form of an electrographic record provided by the invention comprises a substrate, an electrographic toner image on the substrate, and, over the toner image and the substrate, a polymeric layer comprising the polymeric particles of the invention.

The polymeric particles of the invention have all of the characteristics previously described herein as desirable for optimum toner binder particles. Thus, they have very advantageous utility in liquid electrographic developers for high quality imaging. Because the particles have those desirable characteristics and other properties, they also have very advantageous utility in the additional aspects of the invention defined above.

While retaining their particulate nature of sub-micron size, the particles, when coated from a liquid vehicle, can form void-free smooth-surfaced films of a seemingly continuous nature having good transparency, toughness, and resistance to deformation, abrasion or other degradation caused by contact with solvents or other dry or oily materials. The liqid vehicle can be, in addition to electrically insulating organic liquids useful as carriers in electrographic developers provided by the invention, virtually any liquid in which the particles can be dispersed. It can even be the aqueous liquid in which the particles are initially formed by aqueous emulsion polymerization (so long as the particles have not been removed from the aqueous liquid, since they then would not be readily re-dispersible in aqueous liquids). Thus, the particles can be used as film-forming materials in various coating compositions for numerous purposes, for example, to create protective layers, smoothing layers, and electrical barrier layers, to fill in voids in other surfaces, and to overcoat and bind other materials to other surfaces. Only some of the additional utilities are embodied in the other aspects of the invention defined above (i.e., the uses as barrier layers and as overcoats for photoconductive layers and toner images in electrographic elements and records), but many others can be contemplated, for example, utility as binder materials for layers or films to be used for other than electrographic purposes or utility as toner binder materials for dry electrographic developers that contain dry particulate carrier materials or no carrier materials, rather than liquid carrier material.

Furthermore, when a coating composition (whether an electrographic developer or otherwise) is formed by dispersing the particles in a non-aqueous liquid that will swell them, and when the particles and liquid are of a nature such that the Tg of the particles changes from above to below ambient temperature as a result of the swelling, then the coating composition will have a self-fixing characteristic. That is, the coating composition can be simply applied to a surface, the liquid can be simply allowed to evaporate therefrom under ambient temperature conditions, and the particles (although still retaining their particulate character) will form a dry film that is adhered to the surface and is resistant to deformation, unwanted removal or other degradation, without the need for externally effected fixing or film-forming procedures such as application of pressure, heat, other form of radiation, etc. This applies both to imagewise coatings (e.g., as formed by electrographic development processes) and uniform continuous coatings (as with most uses as film overcoats or layers).

DESCRIPTION OF PREFERRED EMBODIMENTS

The polymeric particles within the scope of the invention have been defined above in the Summary of the Invention, with reference to the mixture of monomers useful to produce them by aqueous emulsion polymerization. That definition will hereinafter be referred to as "the broadest particle definition", as a matter of convenience in describing some preferred embodiments of the invention. All percentages stated herein are by weight unless otherwise specified.

In some preferred embodiments of the invention: 2-7 percent of the mixture of monomers comprises the polyfunctional vinyl addition-polymerizable monomers, 0 to less than 10 percent of the mixture comprises the monomers of part A of the broadest particle definition, 25-60 percent of the mixture comprises the monomers of part B of the broadest particle definition, and 30-60 percent of the mixture comprises the monomers of part C of the broadest particle definition.

In some other preferred embodiments of the invention: 2-7 percent of the mixture of monomers comprises the polyfunctional vinyl addition-polymerizable monomers, 49-93 percent of the mixture comprises the monomers of part A of the broadest particle definition, 5-50 percent of the mixture comprises the monomers of part B of the broadest particle definition, and 0-9 percent of the mixture comprises the monomers of part C of the broadest particle definition.

In some particularly preferred embodiments of the invention: 2-5 percent of the mixture of monomers comprises the polyfunctional vinyl addition-polymerizable monomers, 58-90 percent of the mixture comprises the monomers of part A of the broadest particle definition, 8-40 percent of the mixture comprises the monomers of part B of the broadest particle definition, and 0-9 percent of the mixture comprises the monomers of part C of the broadest particle definition.

While virtually any specific type of vinyl monomers encompassed by the broadest particle definition can be used to form the polymeric particles of the invention, in some preferred embodiments: monomers in accordance with part A of the broadest particle definition are selected from: alkyl acrylates, alkyl methacrylates, and vinyl alkanecarboxylates, the alkyl and alkane groups of which contain 4 to 7 carbon atoms; and styrenes having one or more alkyl substituents containing a total of 1 to 3 carbon atoms; monomers in accordance with part B of the broadest particle definition are selected from: alkyl acrylates, alkyl methacrylates, and vinyl alkanecarboxylates, the alkyl and alkane groups of which contain at least 8 carbon atoms; styrenes having an alkyl substituent containing at least 4 carbon atoms; and olefinic hydrocarbons; and monomers in accordance with part C of the broadest particle definition are selected from: styrene; styrenes having an electronegative substituent; alkyl acrylates, alkyl methacrylates, and vinyl alkanecarboxylates, the alkyl and alkane groups of which contain less than 4 carbon atoms; nitriles; and acrylic and styrene monomers having a hydroxy, amido, amino, or quaternary ammonium substituent.

Some specific examples of useful monomers in accordance with part A of the broadest particle definition are isobutyl acrylate, t-butyl acrylate, isobutyl methacrylate, t-butyl methacrylate, n-butyl methacrylate, and p-methylstyrene.

Some specific examples of useful monomers in accordance with part B of the broadest particle definition are 2-ethylhexyl acrylate, 2-ethylhexyl methacrylate, lauryl acrylate, lauryl methacrylate, 4-t-butylstyrene, isoprene, and 1,3-butadiene.

Some specific examples of useful monomers in accordance with part C of the broadest particle definition are styrene, p-chlorostyrene, m-chlorostyrene, p-nitrostyrene, isopropyl methacrylate, ethyl methacrylate, methyl methacrylate, vinyl acetate, acrylonitrile, methacrylonitrile, 2-hydroxyethyl acrylate, N-isopropylacrylamide, N-isobutoxymethylacrylamide, acrylic acid, methacrylic acid, N,N-dimethyl-N-vinylbenzylamine, N-vinylbenzyl-N,N,N-trimethylammonium chloride, and N-(2-methacryloyloxyethyl)-N,N,N-trimethylammonium methosulfate.

Some specific examples of useful polyfunctional vinyl addition-polymerizable monomers in accordance with the broadest particle definition are divinylbenzene, ethylene dimethacrylate, ethylene diacrylate, and N,N'-methylenebisacrylamide.

In some particularly preferred embodiments of the invention the polymeric particles comprise a copolymer of divinylbenzene, isobutyl methacrylate, and either 2-ethylhexyl methacrylate or n-lauryl methacrylate.

While it is sufficient for the purposes of the invention that each of the polymeric particles of the invention have an average diameter less than one micrometer, particles with even smaller diameters are preferred, since they are even more dispersible, enable even higher resolution imaging when used as toner binder particles, and can be used to form images or films having even better structural integrity and resistance to oily abrasion. Accordingly, in some preferred embodiments of the invention each of the polymeric particles has an average diameter less than 0.2 micrometer. In some particularly preferred embodiments of the invention each of the polymeric particles has an average diameter of from 0.02 to 0.1 micrometer.

The polymeric particles of the invention can be prepared by techniques well-known for producing submicronic crosslinked polymeric particles (often referred to as microgels), such as aqueous emulsion polymerization techniques, wherein the monomers are dispersed in an aqueous phase with emulsifying agents, and free radical initiators in the aqueous phase diffuse into micelles swollen with the monomers to initiate polymerization of the monomers within the micelles, with subsequent diffusion of more dispersed monomers into the micelles to continue polymerization of the latexes. In addition to the usual latex preparations employing anionic surfactants and initiators (e.g., persulfates) that yield fairly strongly acidic (i.e., anionic) groups on the surface of the resultant polymeric particles, polymeric particles of the invention can also be prepared with cationic surfactants and initiators; or weakly acidic initiators, e.g., 4,4'-azobis(4-cyanovaleric acid), can also be used to produce polymeric particles within the scope of this invention. The use of weakly acidic initiators has been found to yield polymeric particles having weakly acidic surface characteristics, and such particles have been unpredictably found to be even more readily and reproducibly dispersible in hydrocarbon liquids than those with more strongly acidic surfaces; however, this finding involves the invention of another inventor, as described in copending U.S. application Ser. No. 858,463, filed Apr. 30, 1986, and should not be inferred to be the specific invention of the present inventors, although such weakly acidic embodiments are rightfully also within the present, more generic, invention and are encompassed by the claims presented below.

Known methods for yielding relatively monodisperse particle size distributions are also useful to prepare the polymeric particles of the present invention.

More details of some of the specific preparation techniques useful to create particles of this invention are presented below, immediately preceding the Examples illustrative of some preferred embodiments.

The aqueous mother latex of the polymeric particles of the invention prepared by aqueous emulsion polymerization can be used directly as a coating composition, if desired, to form film coatings comprising the polymeric particles, in accordance with some aspects of the present invention, as mentioned previously herein.

However, in other aspects of the invention (e.g., the use of the particles in liquid electrographic developers), the crosslinked polymeric particles are first isolated from the aqueous medium by well known techniques such as dialysis and freeze-drying. It is optional, but in some cases desirable, then to wash the dry particles with a solvent, such as methanol, to remove the last traces of residual surfactant. The particles can then be readily dispersed (in some case with the aid of dispersing agents) in a non-aqueous electrically insulating organic liquid, in which they are swellable but insoluble, to form a liquid electrographic developer or other coating composition in accordance with the invention.

In general, liquid electrographic developers in accordance with the present invention contain from about 0.005 to about 8 percent by weight of the polymeric particles of the invention, based on total developer. Although liquid developers in accordance with the invention can simply comprise the polymeric particles as self-binding toners dispersed in carrier liquids, it is often desirable to incorporate addenda in the developer such as other toner binder materials, waxes, colorants, dispersion stabilizing agents, and charging agents.

If a colorless image is desired, it is unnecessary to add any colorant. However, more usually a visibly colored image will be desired, and this achieved by including a colorant in the developer, either mixed with or bonded to the polymeric toner binder particles of the invention or mixed with or bonded to an auxiliary toner binder. Useful results are obtained with any of numerous dyes or pigment materials, useful as toner colorants in general. A representative list of useful colorants is found, for example, in *Research Disclosure*, Vol. 109, May 1973, Item 10938, published by Kenneth Mason Publications, Ltd., Emsworth, Hampshire PO10 7DDm England. Colorant concentration can vary widely, but will usually be from 10 to 90 percent by weight of the total dispersed developer constituents. A preferred range is 35 to 45 percent.

The colorant in particulate form can be simply dispersed in the carrier liquid to be deposited along with the polymeric binder particles of the invention during electrophoretic development, or it can be pre-mixed with another of the possible developer constituents, such as an auxiliary binder or stabilizer polymer.

If desired, (e.g., where the intention is to produce a colored toner for an electrographic developer), the polymeric particles of the invention, while in their aqueous latex form, can be made colored by intimately associating them with a dye, for example, by latex loading techniques such as that described in U.S. Pat. No. 4,199,363 or by forming a dye in the presence of the latex particles such as by reaction of phthalaldehyde with ammonia or ammonium ion in the latex medium, which can be followed by isolation of the colored particles from the aqueous medium, as previously described.

The polymeric particles of the invention may also be dyed after isolation from the latex aqueous medium and dispersion in an appropriate non-aqueous organic liquid, such as by reaction of appropriate functional groups of the particulate copolymer with a reactive dye; for example, by reaction of aldehyde groups of the polymeric particles (provided, e.g., by including a monomer such as vinylbenzaldehyde in the original mixture of monomers) with a dye having a functional amino group, to yield polymeric particles having a dye attached through an imine linkage; or, for example, through association of acidic groups provided on the surface of the polymeric particles, such as carboxylic or sulfonic acids, with dyes containing basic groups, such as amines.

When the non-aqueous organic liquid medium of the dispersion is one suitable to serve as an electrographic developer carrier liquid, the dispersion of polymeric particles of the invention therein can readily serve as a liquid electrographic developer, usually with addition of a suitable charging and stabilizing agent to the liquid.

Non-aqueous organic liquids having the requisite carrier liquid characteristics of being volatile at room temperatures, being electrically insulating, having relatively low viscosity, and being capable of having appropriate toner material dispersed therein, are well known in the art of electrography. Such useful carrier liquids have a dielectric constant less than about 3 and a volume resistivity greater than about $10^{10}$ ohm-cm. and include: volatile halogenated hydrocarbon solvents, for example, fluorinated lower alkanes such as trichloromonofluoromethane and trichlorotrifluoroethane, typically having a boiling point in the range of about 2° to 55° C.; volatile isoparaffinic hydrocarbons having a boiling point range from about 145° to 185° C., such as Isopar G TM (a trademark of Exxon Corporation); volatile hydrocarbons having a major aromatic component and a boiling range from about 150° to 185° C., such as the alkylated aromatic hydrocarbon mixture, Solvesso 100 TM (a trademark of Exxon Corporation); and other liquids such as polysiloxanes, odorless mineral spirits, octane, and cyclohydrocarbons such as cyclohexane. Of these liquids, Isopar G TM is the most commonly used carrier liquid, is the preferred carrier liquid for developers of this invention, and is the particular isoparaffinic hydrocarbon liquid that was used to determine solubility and swellability characteristics in regard to the definitions of monomers and polymers herein.

As stated above, liquid electrographic developers in accordance with the invention will usually also have a dispersion stabilizer and charging agent dispersed or dissolved in the carrier liquid. In the case of some polymeric particles of the invention, such as stabilizer will be necessary to achieve adequate dispersion stability of the particles in an isoparaffinic hydrocarbon liquid such as Isopar G TM. However, even in those cases the polymeric particles will usually be capable of achieving adequate dispersion stability by themselves in some of the other useful carrier liquids, such as Solvessor 100 TM or chlorinated hydrocarbons. Nevertheless, it will still usually be desirable to include a stabilizing agent in the liquid, since the preferred materials providing this function are polymeric materials that also provide the charge control function usually necessary in such developers, as described, for example, in U.S. Pat. No. 3,788,995.

A partial listing representative of preferred dual function polymeric stabilizing and charging agents for use in developers of the invention includes poly(styrene-co-lauryl methacrylate-co-sulfoethyl methacrylate), poly(vinyltoluene-co-lauryl methacrylate-co-lithium methacrylate), poly(vinyltoluene-co-lauryl methacrylate-co-lithium methacrylate), poly(styrene-co-lauryl methacrylate-co-lithium methacrylate), poly(t-butylstyrene-co-styrene-co-lithium sulfoethyl methacrylate), poly(t-butylstyrene-co-lauryl methacrylate-co-lithium methacrylate), poly(t-butylstyrene-co-lithium methacrylate), poly(t-butylstyrene-co-lauryl methacrylate-co-lithium methacrylate-co-methacrylic acid), and poly(vinyltoluene-co-lauryl methacrylate-co-methacryloyloxyethyltrimethylammonium p-toluenesulfonate).

Other useful charge control agents include phosphonate materials described in U.S. Pat. No. 4,170,563 and quaternary ammonium polymers described in U.S. Pat. No. 4,229,513.

Various nonpolymeric charge control agents are also useful, such as the metal salts described in U.S. Pat. No. 3,417,019. Other charge control agents known in the liquid developer art can also be employed.

The amount of stabilizing and charge control agent used will vary depending upon the particular agent and its compatibility with the other components of the developer. It is usually desirable to employ an amount of such agent within the range of from about 0.01 to about 10.0 weight percent based on the total weight of a working-strength liquid-developer composition. The agent may be added to the liquid developer simply by dissolving or dispersing the agent in the volatile liquid-carrier vehicle at the time concentrates or melt-blends of the components are combined with the liquid-carrier vehicle to form a working-strength developer.

In some aspects of the invention a liquid electrographic developer will also comprise a wax dispersed in the electrically insulating organic carrier liquid in order to significantly enhance the dry abrasion-resistance of toner images to be formed with such developer, by electrophoretic deposit of wax particles along with the other toner constituents during development. Many waxes are known to be useful in liquid developers in the electrographic art. Preferable waxes for use in accordance with this invention are soluble in a solvent such as Solvesso 100 TM at elevated temperatures (e.g., 100° C.) but insoluble at room temperatures and are selected, for example, from polyethylene waxes, such as Shamrock S-394 TM wax (a trademark of Shamrock Chemical Corporation) or Epolene E-15 TM (a trademark of Eastman Kodak Company), and natural waxes, such as carnauba waxes, beeswax and the like.

In preparing dispersions of such waxes and the polymeric particles of the invention, the wax is added to a solvent, having the polymeric particles dispersed therein, at an elevated temperature such that the wax dissolves in the solvent. The temperature is then lowered so that the wax precipitates to form a stable particulate dispersion in the solvent along with the polymeric particles. The thusly formed wax particles are spherical and have submicronic average diameters, typically in a range of from about 0.1 to 0.5 micrometer. The polymeric particles of the invention apparently act as dispersion stabilizers for the wax particles, although the mechanism of this dispersing action is not presently understood. In liquid electrographic development the wax particles will electrophoretically migrate and deposit alongwith the crosslinked polymeric particles of the invention and any colorants that may also be included. The resultant toner images exhibit increased scratch-resistance, compared to toner images not containing wax.

Alternatively, as discussed further below, the wax can be melt-blended into other toner binder materials, such as polyesterionomer binders, which can also be included in the liquid developer.

Waxes can be usefully included in developers in accordance with the invention in concentrations ranging from trace amounts to about one part per part by weight of binder materials included in the developer. Even higher concentrations of wax may be useful but may be difficult to disperse in the carrier liquid.

Although, as mentioned, the crosslinked polymeric particles of the invention seem to aid in dispersing wax particles in carrier liquids, it is also useful in some cases to include other known wax-dispersing aids in the developers. One such dispersing aid, found to be particularly useful with polyethylene waxes is poly(ethylene-co-vinyl acetate) 72/28, available as Elvax 210 TM (a trademark of E. I. duPont de Nemours and Company). Such a dispersion aid may be included in any useful amount, in some cases even in as high a concentration as one part per part by weight of the wax.

As mentioned above, liquid electrographic developers in accordance with this invention can include other toner binder materials dispersed in the carrier liquid in addition to the crosslinked polymeric particles of the invention. Any known polymeric toner binder material can be used, so long as it can be dispersed without dissolving in the carrier liquid of choice in the form of particles having average diameters less than one micrometer (in keeping with one of the goals of the present invention, i.e., to enable high resolution imaging). Proportions of the crosslinked polymeric particles of the invention and additional polymeric toner binder materials can be varied as desired. Useful developers can be formed wherein either of these components constitutes the major or minor portion of binder material in the developer, and such developers form toner images having significantly fewer defects (e.g., microcracks or "pinholes") than toner images formed from developers containing polyester as the sole binder.

Preferred polymeric toner binder materials to be used in combination with the crosslinked vinyl polymeric particles of the invention are polyesters comprising recurring diol-derived units and recurring diacid-derived units.

More-preferred polyester binders have one or more aliphatic, alicyclic or aromatic dicarboxylic acid-derived recurring units, and recurring diol-derived units of the formula:

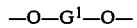

wherein:
G$^1$ represents straight- or branched-chain alkylene having about 2 to 12 carbon atoms or cycloalkylene, cycloalkylenebis(oxyalkylene) or cycloalkylene-dialkylene.

Especially preferred polyesters are those which have up to 35 mole percent (based on the total moles of diacid units) of ionic diacid-derived units of the structure:

wherein:
A represents sulfoarylene, sulfoaryloxyarylene, sulfocycloalkylene, arylsulfonyliminosulfonylarylene, iminobis(sulfonylarylene), sulfoaryloxysulfonylarylene and sulfoaralkylarylene or the alkali metal or ammonium salts thereof. The diol- or diacid-derived units set forth above can be unsubstituted or substituted as desired.

Such preferred polyester resins include, for example, the polyester ionomer resins disclosed in U.S. Pat. No. 4,202,785 and the linear polyesters described in U.S. Pat. No. 4,052,325, the disclosures of which are hereby incorporated herein by reference.

Such polyester binder materials can be included in liquid electrographic developers of the invention simply by pulverizing bulk polyester to the desired size and dispersing the particles in the desired proportion in carrier liquid along with the other components.

Alternatively, and preferably, one or more of the other developer components (e.g., colorant, wax and/or dispersing agent for the wax, but not the stabilizer/charge agent and not the crosslinked polymeric particles of the invention) can be combined with the polyester binder material (e.g., by solution-blending or melt-blending) before pulverization and dispersion thereof in the carrier liquid. Preferably, this is accomplished by melt-blending, i.e., by melting the polyester and blending the other desired components therewith, then cooling to solidify and pulverizing the mixture to form dry particles of the mixture. This insures that the other components will be as easily dispersible in carrier liquid as the polyester particles (since they are included therein) and insures that the other components will be evenly deposited with the polyester binder during electrophoretic development processes and will be evenly depleted from the developer supply. This combination of characteristics also enables some of the other components to be included in concentrations higher than would otherwise be possible and provides for simpler replenishment of depleted developer (since the concentrations of the other components melt-blended with the polyester binder do not have to be separately monitored during development processes, nor do those other components have to be separately replenished at rates different from the replenishment rate for the polyester binder).

Liquid developers in accordance with the aspects of the invention described above can be used in any of the well known processes of electrophoretic imaging to develop toner images from electrostatic latent images carried on a surface of any of various elements well known for that purpose in the electrographic art, such as electrophotographic elements, dielectric recording elements, or image-receiving elements.

In other aspects of the invention, previously defined herein, the crosslinked polymeric particles of the invention are used to form one or more of various layers of electrographic elements or records, e.g., to form overcoats for toner images, overcoats for photoconductive surfaces, and/or electrical barrier layers.

The crosslinked polymeric particles of the invention can be used to form a protective uniform coating over any type of toner image on a surface and thus impart improved abrasion-resistance to the image. Because the particles of the invention form void-free, smooth-surfaced films having good transparency, the visual appearance of the toner image is not adversely affected. Any of the coating compositions of the invention described above (e.g., the aqueous latexes formed in preparing the particles of the invention or the dispersions of the particles in non-aqueous electrically insulating organic liquids) can be used for this purpose, by simply applying a uniform coating of the composition over the imagewise toned surface and allowing or causing the liquid medium to evaporate from the composition. In cases where a dispersion of the particles in electrically insulating liquid is used, it is convenient and more efficient to also apply an electrical bias across the coated liquid and toned surface by known means to cause the particles to electrophoretically migrate to the surface. The addenda described above as useful in liquid developers of the invention (e.g., dispersion stabilizers, waxes, and wax-dispersing aids) can also be included advantageously in such coating compositions to assure uniform coatings and provide even better abrasion-resistance. Even colorants can be included in such coating compositions, if it is desired to provide a uniform tint over the toned surface.

Similarly, the coating compositions of the invention can be used to form a protective uniform coating, comprising the crosslinked polymeric particles of the invention, (and any desired addenda as described above) on any surface to which it is intended later to apply a toner image. It is especially advantageous to apply such a protective overcoat to the outermost surface of any photoconductive layer comprising an outermost layer of any known reusable photoconductive element in order to extend its useful life, by providing dry and oily abrasion-resistance thereto. Furthermore, most known photoconductive layers have somewhat irregular surfaces comprising small voids, in which applied developer can become trapped, eventually causing stains or chemical degradation that impair their performance. The protective overcoats of the present invention provide smoother, more void-free surfaces than any previously known overcoats, and thus provide a better means for avoiding such problems.

In another aspect of the invention, a coating composition of the invention is used to provide an electrical barrier layer, comprising the crosslinked polymeric particles of the invention, sandwiched between an electrically conductive substrate and a photoconductive layer of an electrophotographic element.

Electrical barrier layers, in general, have been described in the prior art for use in electrophotographic elements to prevent unwanted discharge of a charged photoconductive layer, in the absence of activating radiation, such discharge being caused by injection of charges into the photoconductive layer from an electrically conductive substrate, e.g., a substrate coated with cuprous iodide. Such unwanted discharge is often referred to as dark decay. See, for example, U.S. Pat. Nos. 3,554,742 and 3,640,708. Cellulose nitrate has been described in the past as a useful barrier layer material to be interposed between the conductive substrate and photoconductive layer or layers. However, there are problems associated with such use. Cellulose nitrate tends to bleach some dyes often contained in photoconductive layers, and it cannot be simultaneously coated along with an electrically conductive layer such as cuprous iodide, since cuprous iodide is conveniently solvent-coatable, but simultaneous coating of a barrier layer over it would require a barrier material coatable from a hydrocarbon medium, which cellulose nitrate is not.

The crosslinked polymeric particles of the present invention, however, provide good electrical barrier layer properties, do not tend to bleach dyes in photoconductive layers, and can be dispersed in and coated in conjunction with a hydrocarbon liquid such as heptane. The present polymeric particles thus provide a superior substitute for cellulose nitrate barrier layers.

The following preparation techniques and examples are presented to further illustrate some preferred embodiments of the invention. In all preparations and examples unless otherwise noted, monomers were used as received from suppliers without removal of any inhibitors included, and relative proportions following copolymer names represent parts of the respective monomers per 100 parts by weight of the total mixture of monomers used to prepare the copolymer. Particle sizes (average diameters) were estimated by visual inspection of electron micrographs.

Preparation A—used to prepare the crosslinked vinyl polymeric particles of Examples 1-11.

| Ingredients | parts in Head | parts in Pot at 90° C. |
| --- | --- | --- |
| the mixture of monomers | 150 | — |
| 20% Alipal Co 436 TM * | 5.63 | 5.63 |
| $K_2S_2O_8$ | — | 1.5 |
| $Na_2S_2O_5$ | 1.0 | 0.5 |
| $H_2O$ | 88 | 180 |

*Alipal Co 436 TM (a trademark of GAF Corp.) is an ammonium salt of a sulfate ester of an alkylphenoxypoly(ethyleneoxy) ethanol.

Procedure: The pot consisted of the appropriately sized 4-neck round-bottom flask fitted with a reflux condenser, mechanical stirrer, inlet port for $N_2$ purge and head ingredients, and an additional port for the addition of initiators and/or a thermometer. The pot ingredients, minus the persulfate and bisulfite initiators, were added to the flask which was heated in a constant temperature bath at 90° C., while the contents were stirred under a $N_2$ purge for 10-30 minutes. During this time, the pre-emulsified head ingredients were stirred in a suitable addition apparatus and also purged with $N_2$. The persulfate and bisulfite initiators were then added to the pot, and after 2-3 minutes, addition of the head ingredients were begun and completed in approximately 30 minutes. Stirring was continued for an additional 2.5–3 hours at 90° C., followed by cooling to room temperature and filtering. The pH of the latex was typically 2.0–2.5. The latices produced were routinely of low particle size and excellent stability, and contained very little coagulum. The measured solids content was routinely 33.5 to 34.5 wt% (35% theoretical). The polymer was isolated by first dialyzing the diluted latex ($\sim\frac{1}{2}$) in distilled water for 2–3 days, and then freeze-drying for 2–3 days. The dried polymer was optionally washed with methanol to remove residual surfactant, and dried in a vacuum oven at 40°–50° C.

EXAMPLE 1

Poly(isobutyl methacrylate-co-divinylbenzene) 98/2 was prepared in accordance with Preparation A. The average particle size was 0.06 micrometer.

EXAMPLE 2

Poly(isobutyl methacrylate-co-2-ethylhexyl methacrylate-co-divinylbenzene) 88/10/2 was prepared according to Preparation A.

EXAMPLE 3

Poly(isobutyl methacrylate-co-2-ethylhexyl methacrylate-co-divinylbenzene) 86/10/4 was prepared according to Preparation A. The average particle size was 0.07 micrometer.

EXAMPLE 4

Poly(isobutyl methacrylate-co-2-ethylhexyl methacrylate-co-divinylbenzene) 84/10/6 was prepared according to Preparation A. The average particle size was 0.08 micrometer.

EXAMPLE 5

Poly(isobutyl methacrylate-co-2-ethylhexyl methacrylate-co-divinylbenzene) 83/15/2 was prepared mostly in accordance with Preparation A, except that the run was made at 15% solids and with 15 parts of 20% Alipal Co 436 TM. The average particle size was 0.03 micrometer.

EXAMPLE 6

Poly(isobutyl methacrylate-co-2-ethylhexyl methacrylate-co-divinylbenzene) 83/15/2 was prepared according to Preparation A. The average particle size was 0.07 micrometer.

EXAMPLE 7

Poly(isobutyl methacrylate-co-2-ethylhexyl methacrylate-co-divinylbenzene) 83/15/2 was prepared mostly in accordance with Preparation A, except that 1.88 parts of 20% Alipal Co 436 TM were used. The average particle size was 0.10 micrometer.

EXAMPLE 8

Poly(isobutyl methacrylate-co-2-ethylhexyl methacrylate-co-divinylbenzene) 78/20/2 was prepared in accordance with Preparation A. The average particle size was 0.08 micrometer.

EXAMPLE 9

Poly(isobutyl methacrylate-co-2-ethylhexyl methacrylate-co-divinylbenzene) 67/31/2 was prepared in accordance with Preparation A.

EXAMPLE 10

Poly(isobutyl methacrylate-co-2ethylhexyl methacrylate-co-N-(isobutoxymethyl)acrylamide-co-divinylbenzene) 78/15/5/2 was prepared according to Preparation A. The average particle size was 0.07 micrometer.

EXAMPLE 11

Poly(isobutyl methacrylate-co-2-ethylhexyl methacrylate-co-N-(vinylbenzyl)-N,N,N-trimethylammonium chloride-co-divinylbenzene) 81/15/2/2 was prepared according to Preparation A.

Preparation B—used to prepare the crosslinked vinyl polymeric particles of Examples 12 and 13, having more monodisperse particle size distributions than particles prepared according to Preparation A.

Procedure: The reaction flask described in Preparation A was charged with 900 parts distilled $H_2O$, and was purged with $N_2$ at 95° C., for 10–15 minutes. Inhibitors were removed from the monomers by passing them through a basic alumina column. Then 100 parts of the mixture of monomers was placed in an addition flask and also purged with $N_2$. After sufficient purging, 1.0 part $K_2S_2O_8$ was added to the flask, followed by rapid addition of the monomers. The temperature of the pot increased only slightly ($\sim 1°-2°$ C.), and stirring was continued for 3 hours total. Only a small amount of coagulum was formed. The latex was then cooled, filtered, dialyzed for 2–3 days, and freeze-dried for 3 days to yield a dry polymer powder.

EXAMPLE 12

Poly(isobutyl methacrylate-co-divinylbenzene) 98/2 was prepared according to Preparation B. The average particle size was 0.20 micrometer.

EXAMPLE 13

Poly(isobutyl methacrylate-co-2-ethylhexyl methacrylate-co-divinylbenzene) 78/20/2 was prepared according to Preparation B. The average particle size was 0.175 micrometer.

Preparation C—used to prepare the crosslinked vinyl polymeric particles of Examples 14–19.

| Ingredients | parts in Head | parts in Pot |
|---|---|---|
| Monomer mixture | 150 parts | — |
| Sodium Lauryl Sulfate | 0.6 parts | 0.9 parts |
| Igepal CA520 TM * | 7.5 parts | 7.5 parts |
| Sodium Tetraborate | 0.72 parts | 0.03 parts |
| $K_2S_2O_8$ | 0.6 parts | 0.15 parts |
| $H_2O$ | 225 parts | 48 parts |

*Igepal CA 520 TM (a trademark of GAF Corporation) is an octylphenoxypoly(ethyleneoxy)ethanol surfactant.

Procedure: The reaction vessel described in Preparation A was charged with the pot ingredients which were purged with $N_2$ for 15–20 minutes while the temperature of the pot was raised to 80° C.; the persulfate was then added and the temperature was raised to 85° C. After 10 minutes, addition of the stirred, emulsified head mixture began and continued for 2.5 hours followed by stirring an additional hour at 90° C. (the head ingredients were emulsified in a shearing blender for 5 minutes prior to placement in the addition vessel). The latex was cooled and filtered. Typical solids contents were 34–35% (36% theoretical). The polymer was isolated by precipitation of the latex upon addition to a 10X volume of methanol, followed by two more washings of the coagulated polymer with methanol. The polymer was then vacuum dried at 30°–45° C.

EXAMPLE 14

Poly(isobutyl methacrylate-co-n-lauryl methacrylate-co-divinylbenzene) 88/10/2 was prepared according to Preparation C.

EXAMPLE 15

Poly(isobutyl methacrylate-co-n-lauryl methacrylate-co-divinylbenzene) 86/10/4 was prepared according to Preparation C.

EXAMPLE 16

Poly(isobutyl methacrylate-co-n-lauryl methacrylate-co-divinylbenzene) 84/10/6 was prepared according to Preparation C.

EXAMPLE 17

Poly(isobutyl methacrylate-co-n-lauryl methacrylate-co-divinylbenzene) 78/20/2 was prepared according to Preparation C. The average particle size was 0.06 micrometer.

EXAMPLE 18

Poly(chlorostyrene-co-n-lauryl methacrylate-co-divinylbenzene) 57/41/2 was prepared according to Preparation C.

EXAMPLE 19

Poly(chlorostyrene-co-p-t-butylstyrene-co-divinylbenzene) 49/49/2 was prepared according to Preparation C. The average particle size was 0.07 micrometer.

EXAMPLE 20 (cationic preparation)

Poly(isobutyl methacrylate-co-2-ethylhexyl methacrylate-co-divinylbenzene) 83/15/2 having an average particle size of 0.07 micrometer was prepared as follows:

| Ingredients | parts in Head | parts in Pot at 80° C. |
|---|---|---|
| Monomer mixture | 150 parts | — |
| 30% Olin Surfactant 10G TM * | 9.0 parts | 1.0 part |
| Cetyltrimethyl-ammonium bromide | 0.6 part | 0.9 part |
| 2,2′-azobis(2-amidino-propane) hydrochloride | 0.9 part | 0.075 part |
| H$_2$O | 200 parts | 420 parts |

*Olin Surfactant 10G TM (a trademark of Olin Chemical Co.) is a p-isononylphenoxypolyglycidol surfactant.

Procedure: the pot ingredients were placed in the reaction flask described in Preparation A and stirred at 50° C. for 30 minutes with a N$_2$ purge. The pot temperature was raised to 80° C., and the pre-emulsified head ingredients were added over a period of 2 hours, followed by stirring an additional 3 hours at 80° C. The latex was cooled and filtered. Solids contents was 19.4% (20% theoretical). The polymer was isolated by dialysis (2–3 days) and freeze-drying (2–3 days).

The crosslinked vinyl polymeric particles of Examples 1–20 above were determined to be insoluble, swellable, and dispersible in one or more of various electrically insulating organic liquids such as Isopar G TM or Solvesso 100 TM to form coating compositions and liquid electrographic developers useful in the practice of the further aspects of the invention previously described and further exemplified below.

EXAMPLE 21

Polymeric particles comprising poly(isobutyl methacrylate-co-2-ethylhexyl methacrylate-co-divinylbenzene) 57/41/2 were prepared in a manner similar to that of Preparation A with additional formation of phthalaldehyde dye in the latex medium, such that the isolated and dried particles comprised 20% dye. Four grams of these particles were combined with 2 grams of a stabilizer-charge agent polymer, namely, poly(t-butylstyrene-co-lauryl methacrylate-co-lithium methacrylate-co-methacrylic acid), and 38 grams of Isopar G TM and were ball-milled for 2 days to achieve good mixing in the dispersion. Two ml of this dispersion was further diluted with Isopar G TM to create 237 ml of liquid electrographic developer. When used in a typical electrophoretic development process, the developer produced very sharp toner images.

EXAMPLE 22

A dry, powdered blue pigment, Monolite Blue, C.I. 69800, was added to a 7.2% solution of the stabilizer-charge agent of Example 21 in Solvesso 100 TM to yield a pigment/stabilizer weight ratio of 1/1.3. This mixture was ball-milled for two weeks to form a stable dispersion of pigment particles in the solution. A 10% dispersion of the crosslinked polymeric particles of Example 6 in Solvesso 100 TM was added to the pigment dispersion to form a pigment/crosslinked particle weight ratio of 1/1. Isopar G TM was added to dilute this mixture under ultrasonic shear and form 1 pint (473 ml) of a liquid electrographic developer having 0.35 g/l of pigment and a pigment/stabilizer/crosslinked particle weight ratio of 1/1.3/1. When used in a typical electrophoretic development process to develop toner images from electrostatic latent images on typical electrophotographic elements, such as Kodak Ektavolt SO101 TM Recording Film, the developer produced sharp toner images having maximum optical density (Dmax) greater than 2 and resolution of at least 322 lines/mm.

EXAMPLE 23

In order to illustrate the effect of crosslinked particles on toner image oily abrasion-resistance, a series of developers were prepared as in Example 22, having various pigment/stabilizer/crosslinked particle ratios of 1/1.4/X. A control developer containing no crosslinked particles was similarly prepared for comparison. The series of developers were used in runs of the same electrophoretic development process to yield toner images, the oil abrasion-resistance of which was determined by the following test.

Oily Abrasion-Resistance Test

This test simulates the effect of finger-rubbing on a toner image. A 700 gram-weighted, oleic acid-soaked, circular tissue patch of approximately 5 mm diameter is rested on a toner image-bearing surface, which is oscillated back and forth under the patch. Oily abrasion-resistance is determined as a range, A–B, wherein A is the number of oscillations (one oscillation being one back and forth movement of the image-bearing surface) needed to first interrupt the onter image structural integrity, and B is the number of oscillations needed to completely remove the contacted portion of the toner imge from the image-bearing surface. A values of at least 1 and B values of at least 2 are considered barely sufficient for reasonably practical oily abrasion-resistance, while, of course, higher values are better.

The results of the oily abrasion resistance test on toner images produced by the developers of this example are shown in Table I.

TABLE I

Oily Abrasion-Resistance in regard to crosslinked particle content

| Crosslinked Particle Content (X) | toner image optical density | oily abrasion-resistance (A-B) |
|---|---|---|
| 0 (control) | 1.2 | <1-1 |
| 1.0 | 0.9 | 6-18 |
| 1.5 | 1.5 | 18-70 |
| 2.0 | 1.3 | 15-60 |

Table I shows that inclusion of the crosslinked polymeric particles of the invention in liquid electrographic developers yields toner images having better than sufficient oily abrasion-resistance compared to the insufficient oily abrasion-resistance of the control.

EXAMPLE 24

In this example, the effect of "soluble monomer" content of the crosslinked polymeric particles on oily abrasion-resistance is illustrated. By the term, "soluble monomer", we mean monofunctional vinyl addition-polymerizable monomers, the homopolymers of which would be soluble in an isoparaffinic hydrocarbon liquid such as Isopar G TM, i.e., the monomers of part B of the broadest particle definition in the Summary of the Invention above. Developers were prepared and used as in Example 22, having pigment/stabilizer/crosslinked particle weight ratios of 1/1.4/1. Each developer contained different crosslinked polymeric particles. Two groups of crosslinked polymeric particles were chosen from previous examples, Group A comprising poly(isobutyl methacrylate-co-2-ethylhexyl methacrylate-co-divinylbenzene) copolymers, wherein the "soluble monomer" is 2-ethylhexyl methacrylate, and Group B comprising poly(isobutyl methacrylate-co-n-lauryl methacrylate-co-divinylbenzene) copolymers, wherein the "soluble monomer" is n-lauryl methacrylate. Within groups, particles from different Examples had different "soluble monomer" content, expressed as weight percent of total monomer mixture. Oily abrasion-resistance of toner images produced by each developer were determined in accordance with the test described in Example 23 and are shown in Table II.

TABLE II

Oily abrasion-resistance in regard to "soluble monomer" content

| Crosslinked Particles (Example and Groups) | "soluble monomer" content (percent of total monomers) | toner image optical density | oily abrasion-resistance (A-B) |
|---|---|---|---|
| Ex. 2 (Grp. A) | 10 | 1.2 | 18-70 |
| Ex. 8 (Grp. A) | 20 | 1.3 | 16-65 |
| Ex. 9 (Grp. A) | 31 | 1.2 | 14-32 |
| Ex. 14 (Grp. B) | 10 | 1.1 | 15-35 |
| Ex. 17 (Grp. B) | 20 | 1.1 | 4-10 |

The results in Table II indicate that as soluble monomer" content of the crosslinked polymeric particles is increased, oily abrasion-resistance decreases (although it was more than adequate in all cases). However, as "soluble monomer" content increases, so does ease of dispersibility of the particles in non-aqueous media. Therefore, one can optimize the balance of these properties for any particular circumstances of use, by adjusting "soluble monomer" content. However, degree of crosslinking is also an important parameter in balancing such properties, as shown by the next Example.

EXAMPLE 25

In this example, the effect of crosslinking monomer content of the crosslinked polymeric particles on oily abrasion-resistance is illustrated. As in Example 24, developers having pigment/stabilizer/crosslinked particle weight ratios of 1/1.4/1 were prepared as in Example 22, from two groups of crosslinked polymeric particles and used as in Example 22. The groups, A and B, were formed from the same types of copolymers as in Example 24, but, in this Example the content of crosslinking polyfunctional monomer (divinylbenzene in both groups) was varied, rather than the content of "soluble monomer". Oily abrasion-resistance of toner images produced by each developer were determined in accordance with the test described in Example 23 and are shown in Table III.

TABLE III

Oily abrasion-resistance in regard to crosslinking monomer content

| Crosslinked Particles (Example and Group) | Crosslinking monomer content (percent of total monomers) | Toner image Optical density | Oily Abrasion-Resistance (A-B) |
|---|---|---|---|
| Ex. 2 (Grp. A) | 2 | 1.2 | 18-70 |
| Ex. 3 (Grp. A) | 4 | 1.3 | 2-6 |
| Ex. 4 (Grp. A) | 6 | 1.0 | <1-1 |
| Ex. 14 (Grp. B) | 2 | 1.1 | 15-35 |
| Ex. 15 (Grp. B) | 4 | 1.0 | 12-35 |
| Ex. 16 (Grp. B) | 6 | 1.0 | 8-26 |

The results in Table III indicate that optimum oily abrasion-resistance was achieved for the particular types of polymers in this example when crosslinking monomer content was about 2 percent of the total monomers. The decrease in oily abrasion-resistance with higher crosslinking content is hypothesized to be due to a decrease in film-forming ability, though this is not certain. If it is desired to use the higher crosslinking levels for better structural integrity and resistance to solvent attack, the decreased oily abrasion-resistance can be compensated for, somewhat, by decreasing the "soluble monomer" content; however, this cannot be carried too far, since increased crosslinking monomer and decreased "soluble monomer" content will also tend to decrease dispersibility in non-aqueous media.

EXAMPLE 26

In this example, the oily abrasion-resistance effects of crosslinked polymeric particle size and weight ratio of crosslinked particles to pigment is illustrated. The crosslinked polymeric particles of Examples 5, 6, and 7, having particle sizes of 0.03, 0.07, and 0.10 micrometer respectively, were each included in separate developers prepared as in Example 22 with pigment/stabilizer/crosslinked particle ratios of both 1/1.4/1 and 1/1.4/2. The oily-abrasion resistance of toner images of differing optical densities for each of the six developers were determined by the test described in Example 23 and are shown in Table IV.

TABLE IV

Oily abrasion-resistance in regard to crosslinked polymeric particle size and weight ratio of crosslinked particles to pigment

| Crosslinked polymeric particles | | | Toner image optical density | oily-abrasion-resistance (A-B) |
|---|---|---|---|---|
| identity (Example) | size (micrometer) | weight ratio to pigment | | |
| 5 | 0.03 | 1 | 0.8 | 2–3 |
| " | " | " | 1.2 | 5–20 |
| " | " | " | 1.5 | 10–45 |
| 5 | 0.03 | 2 | 0.7 | 2–7 |
| " | " | " | 1.0 | 8–35 |
| " | " | " | 1.3 | 15–60 |
| 6 | 0.07 | 1 | 0.8 | 3–9 |
| " | " | " | 1.3 | 6–15 |
| " | " | " | 1.6 | 12–30 |
| 6 | 0.07 | 2 | 0.7 | 3–9 |
| " | " | " | 1.1 | 15–50 |
| " | " | " | 1.3 | 25–90 |
| 7 | 0.10 | 1 | 1.0 | 1–3 |
| " | " | " | 1.5 | 2–4 |
| " | " | " | 1.7 | 2–4 |
| 7 | 0.10 | 2 | 0.7 | 2–6 |
| " | " | " | 1.0 | 5–25 |
| " | " | " | 1.2 | 15–45 |

The results in Table IV show that oily abrasion-resistance was at least sufficient in all cases, but was better for the smaller particle sizes and for greater weight ratios of crosslinked particles to pigment. In regard to the particle size results, the poorer results for larger particle sizes are hypothesized to be due to their lower surface area/mass ratio resulting in poorer film-forming properties. The weight ratios results are consistent with those of Table I in Example 23, wherein one would estimate that best results are achieved at crosslinked particle/pigment ratios closer to 2, rather than 1.

EXAMPLE 27

In this example a liquid electrographic developer further comprising a wax component in accordance with the invention is illustrated.

5.67 part of the crosslinked polymeric particles of Example 6 were dispersed in 62 ml of Solvesso-100 TM in a mechanically stirred flask immersed in an oil bath at 100° C. When dispersion was complete, 1.13 parts of a polyethylene wax (Epolene E-15 TM, Eastman Kodak Company) were added which quickly melted and dissolved in the Solvesso-100 TM. The hot solution was then poured through a condenser coil cooled with ice water to effect rapid cooling of the dispersion. Upon cooling the wax precipitates to give a hazy, stable dispersion having 10% solids.

Appropriate amounts of this crosslinked particle/wax dispersion and the ball-milled pigment/stabilizer dispersion of Example 22 were combined to form a developer premix, wherein the pigment/stabilizer/crosslinked particle/wax weight ratio was 1/1.3/1.67/0.33. One pint (473 ml) of liquid developer having a pigment concentration of 0.35 g/l was prepared by dilution of the premix with an appropriate amount of Isopar G TM under ultrasonic shear. When used in a typical electrophoretic development process, the developer provided high resolution, high density toner images having high dry abrasion-resistance.

EXAMPLE 28

In this example a liquid electrographic developer in accordance with the invention, that contains a polyester binder in addition to the crosslinked particle/wax dispersion of Example 27, is illustrated, and the dry abrasion-resistance of its toner images after development are compared to that of toner images formed from the same developer without the crosslinked particle/wax dispersion.

53.3 parts of Raven 1255 TM carbon black pigment (available from Cities Service Co.) and 800 parts of a 10% solution of the stabilizer polymer of Example 21 in Solvesso-100 TM were combined and ball-milled for three days.

38.8 parts of the blue pigment of Example 22 and 700 parts of a 7.2% solution of the stabilizer polymer of Example 21 in Solvesso-100 TM were combined and ball-milled for three days.

Appropriate amounts of the two ball-milled compositions above were combined with appropriate amounts of a 25% solution of the charge-control polymer, poly(-vinyltoluene-co-lauryl methacrylate-co-methacryloyloxyethyltrimethylammonium p-toluene sulfonate) 64/24/2; the polyester binder, poly[neopentylene 4-methylcyclohexene-1,2-dicarboxylate-co-terephthalate-co-5-(N-potassio-p-toluenesulfonamidosulfonyl-)isophthalate (50/45/5)]; the carrier liquid, Isopar G TM; and the crosslinked particle/wax dispersion of Example 27, under shear to form one liter of a liquid developer having a pigment concentration of about 0.7 g/l, wherein the pigment was a 65/35 mix of the black and blue pigments, and wherein the weight ratio of pigment/stabilizer polymer/polyester binder/charge-control polymer/crosslinked particle/wax was 1/1.4/1.2/0.2/1.07/0.33.

A similar developer, to be used as a control for comparison, was prepared in a similar manner, but without the inclusion of the crosslinked particles and wax.

Both developers were used in a typical electrophoretic development process to produce toner images of various optical densities on a typical electrophotographic element, such as Kodak Ektavolt SO101 TM Recording Film. The dry abrasion-resistance of these toner images was then determined by the following test.

Stylus Scratch Test

Dry abrasion-resistance is measured with an apparatus comprising a flat-tipped stylus mounted on a balanced lever arm. The stylus is weighted to 20 grams and its tip is rested on the toned surface of the toner image-bearing element, which lies on a platen that can be oscillated back and forth. Dry abrasion-resistance is determined as a range, A—B, wherein A is the number of oscillations (one oscillation being one back and forth movement of the image-bearing surface on which the stylus rests) needed to first visibly damage (i.e., form a visible scratch in) the toner image, and B is the number of oscillations needed to break completely through the toner image and bare the surface to which it is adhered.

The results of the stylus scratch test on toner images produced by the inventive developer and control developer of this example are shown in Table V.

TABLE V

Dry abrasion-resistance of toner images produced by inventive developer containing crosslinked particles and wax and by control developer

| Developer | toner image optical density | dry abrasion resistance (A-B) |
|---|---|---|
| control | 1.9 | 2–4 |
| " | 1.1 | 1–2 |
| " | 0.6 | <1–1 |

TABLE V-continued

Dry abrasion-resistance of toner images produced by inventive developer containing crosslinked particles and wax and by control developer

| Developer | toner image optical density | dry abrasion resistance (A–B) |
| --- | --- | --- |
| inventive | 1.8 | 30–45 |
| " | 1.2 | 21–32 |
| " | 0.7 | 21–26 |

The results in Table V show that toner images produced by the inventive developer containing crosslinked particles and wax were much more resistant to dry abrasion than toner images produced by the control developer (prior art). The stylus scratch test used for this evaluation is an attempt to quantify scratch-resistance of the type required when a toned photoconductive element is run through a machine such as a reader or when it encounters a sharp edge or grit in any kind of handling. This is different from the oily abrasion-resistance test, which quantitatively simulates the effect of rubbing by human fingers.

The following Examples 29–32 illustrate the self-fixing capability of liquid electrographic developers of the invention.

EXAMPLE 29

The crosslinked polymeric particles of Example 6 were used to prepare three liquid electrographic developers in accordance with Example 22, except that the pigment/stabilizer ratio was 1/0.8, and, instead of the blue pigment of Example 22, each developer had a different single pigment chosen from a cyan pigment (Cyan Blue GTNF), a magenta pigment (Sunfast Quinacridone), and a yellow pigment (Permanent Yellow HR). Each developer was used in a typical electrophoretic imaging process to form toner images of various optical densities on a typical electrophotographic element. In each case a portion of the toner image was heat-fixed (i.e., fixed to the electrophotographic element after development by heating to 110° C.), and a separate portion of the toner image was self-fixed (i.e., fixed to the electrophotographic element after development simply by allowing the carrier liquid to evaporate from the image at room temperature—approximately 23° C.). The oily abrasion-resistances of the resultant toner images were measured in accordance with the test described in Example 23. Results are presented in Table VI.

TABLE VI

Self-fixing and heat-fixing of inventive developers containing pigment, stabilizer, and inventive crosslinked particles

| Pigment used | toner image optical density | Oily abrasion-resistance (A–B) | |
| --- | --- | --- | --- |
| | | self-fixed toner image | heat-fixed toner image |
| cyan | 1.6 | 15–35 | 8–30 |
| " | 1.1 | 5–18 | 3–9 |
| magenta | 1.7 | 23–65 | 30–85 |
| " | 1.1 | 9–30 | 11–30 |
| yellow | 2.2 | 4–8 | 7–30 |
| " | 1.0 | 1–2 | 2–7 |

The results in Table VI show that all the toner images had at least adequate oily abrasion-resistance, and, thus, were adequately fixed both when heat-fixed at 110° C. and when allowed to self-fix at room temperature. It was also noted that each of the developers, which exhibited very little light-scattering, produced very transparent toner images, whether heat-fixed or self-fixed. Such transparency is a very useful property, for example, in processes of preparing imaged transparencies or in preparing multiple overlapping images of different colors.

EXAMPLE 30

In this example the heat-fixing and self-fixing capabilities of developers, containing polyester binder, wax, and various amounts of the crosslinked polymeric particles of Example 6, were investigated.

A black pigment concentrate was prepared by combining 30 g of the black pigment of Example 28, 24 g of the stabilizer polymer, poly(t-butylstyrene-co-lithium methacrylate) 97/3, and 446 g of Solvesso-100 TM and ball-milling the combination for 14 days.

A blue pigment concentrate was prepared by combining 30 g of the blue pigment of Example 22, 24 g of the stabilizer polymer, poly(t-butylstyrene-co-lithium methacrylate) 97/3, and 446 g of Solvesso-100 TM and ball-milling the combination for 14 days.

A wax dispersion was prepared by combining 15 g of the polyethylene wax, Shamrock S-394 TM (available from and trademarked by Shamrock Chemical Corp.), 7.5 g of the wax-dispersing aid, poly(ethylene-co-vinyl acetate) 72/28, and 202.5 g of Solvesso-100 TM and ball-milling the combination for 14 days.

A 10% polyester binder solution was prepared by dissolving 50 g of the polyester binder, poly[neopentylene 4-methylcyclohexene-1,2-dicarboxylate-co-terephthalate-co-5-(N-potassio-p-toluenesulfonamidosulfonyl-)isophthalate (53/43/4)]; in 450 g of Solvesso-100 TM.

A 10% charge-control polymer solution was prepared by dissolving 50 g of the charge-control polymer, poly(vinyltoluene-co-lauryl methacrylate-co-methacryloyloxyethyltrimethylammonium-p-toluene sulfonate) 64/24/2, in 450 g of Solvesso-100 TM.

Various premixes were then prepared by mixing various amounts (including zero amount-to form a control) of the crosslinked polymeric particles of Example 6 with 9.10 g of the black pigment concentrate, 4.90 g of the blue pigment concentrate, 3.15 g of the wax dispersion, 10.08 g of the 10% polyester binder solution, and 1.47 g of the 10% charge-control polymer solution.

Various developers were then prepared by mixing the various premixes, under shear, with Isopar G TM carrier liquid to form 1.21 of developer. Each developer had a 65/35 mix of black pigment/blue pigment, and the overall weight ratio of the components, pigment/stabilizer polymer/polyester binder/charge-control polymer/wax/wax-dispersing aid/crosslinked polymeric particles, was 1.0/0.8/1.2/0.175/0.25/0.125/x.

Each of the developers was used in a typical electrophoretic development process to form a toner image on the surfaces of the electrophotographic element, Kodak Ektavolt SO-101 TM Recording Film. In each case a portion of the toner image was heat-fixed at 110° C., and a separate portion of the toner image was allowed to self-fix at room temperature. Oily abrasion-resistance of each toner image was measured in accordance with the test procedure of Example 23, and dry abrasion-resistance of each toner image was measured in accordance with the stylus scratch test procedure of Example 28 (except that a 50 g-weighted stylus was used, instead of the 20 g-weighted stylus). Results are presented in Table VII.

TABLE VII

Self-fixing and heat-fixing of inventive developers containing polyester binder, wax, and various amounts of inventive crosslinked polymeric particles

| parts crosslinked polymeric particles in developer (X) | Toner image optical density | Oily abrasion-resistance (A–B) | | dry abrasion-resistance (A–B) | |
|---|---|---|---|---|---|
| | | self-fixed toner image | heat-fixed toner image | self-fixed toner image | heat-fixed toner image |
| 0 (control) | 1.6 | <1–1 | 38–105 | <1–1 | 80–150 |
| 0.10 | 1.7 | <1–1 | 48–140 | <1–1 | 110–145 |
| 0.25 | 1.7 | <1–1 | 40–110 | <1–1 | 65–80 |
| 0.50 | 1.6 | <1–1 | 37–85 | <1–1 | 60–80 |
| 1.00 | 1.4 | 7–30 | 32–80 | 7–11 | 65–105 |
| 2.00 | 1.2 | 14–40 | 25–70 | 5–12 | 95–105 |

The data in Table VII show that all developers produced adequate heat-fixed toner images, and that adequate self-fixed toner images were produced when the developer contained one or more parts of the inventive crosslinked polymeric particles.

EXAMPLE 31

In this example the heat-fixing and self-fixing capabilities of developers, containing the crosslinked particles of Example 6, wax, and various amounts of polyester binder, were investigated.

Various developers were prepared using the same components and procedures as in Example 30, except that in this case the amount of polyester binder, rather than the amount of inventive crosslinked particles, was varied.

In each developer the overall weight ratio of components, pigment/stabilizer polymer/polyester binder/-charge-control polymer/wax/wax-dispersing aid/-crosslinked polymeric particles, was 1.0/0.8/Y/0.175/0.25/0.125/1.0.

Each developer was used to form self-fixed and heat-fixed toner images as in Example 30, and each toner image was tested as in Example 30. Results are presented in Table VIII.

TABLE VIII

Self-fixing and heat-fixing of inventive developers containing inventive crosslinked polymeric particles, wax, and various amounts of polyester binder.

| parts polyester binder in developer (Y) | toner image optical density | Oily abrasion-resistance (A–B) | | dry-abrasion-resistance (A–B) | |
|---|---|---|---|---|---|
| | | self-fixed toner image | heat-fixed toner image | self-fixed toner image | heat-fixed toner image |
| 0 | 1.3 | 6–15 | 7–14 | 15–23 | 25–40 |
| 0.15 | 1.6 | 11–28 | 10–25 | 12–40 | 22–42 |
| 0.30 | 1.6 | 11–25 | 14–28 | 20–55 | 25–45 |
| 0.60 | 1.7 | 12–37 | 18–50 | 8–14 | 48–56 |
| 1.20 | 1.5 | 8–18 | 32–85 | 10–16 | 42–55 |
| 2.40 | 1.3 | <1–1 | 50–>200 | <1–1 | 55–68 |

The results in Table VIII show that all developers except the one with 2.4 parts polyester binder produced adequate self-fixed and heat-fixed toner images. The good results with zero parts polyester binder show that, as in Example 29, polyester binder is not necessary for producing adequately fixable toner images, but a small amount improves the results.

EXAMPLE 32

In this example the heat-fixing and self-fixing capabilities of developers, containing various crosslinked particles of previous examples, were investigated.

Various developers were prepared using the same components and procedures as in Examples 30 and 31, except that in this case the type of inventive crosslinked particles included was varied.

In each developer the overall weight ratio of components, pigment/stabilizer polymer/polyester binder/-charge-control polymer/wax/wax-dispersing aid/-crosslinked polymeric particles, was 1.0/0.8/0.5/0.175/0.25/0.125/1.0.

Each developer was used to form self-fixed and heat-fixed toner images as in Example 30, and each toner image was tested as in Example 30. Results are presented in Table IX.

TABLE IX

Self-fixing and heat-fixing of inventive developers containing wax, polyester binder, and various inventive crosslinked polymeric particles

| Identity of crosslinked polymeric particles (Example) | Toner image optical density | Oily abrasion-resistance (A–B) | | dry-abrasion resistance (A–B) | |
|---|---|---|---|---|---|
| | | self-fixed toner image | heat-fixed toner image | self-fixed toner image | heat-fixed toner image |
| Ex. 1 | 1.7 | 2–3 | 24–52 | 8–12 | 10–12 |
| Ex. 2 | 1.7 | 10–25 | 15–33 | 12–15 | 30–45 |
| Ex. 3 | 1.9 | 1–2 | 25–60 | 6–10 | 35–50 |
| Ex. 4 | 1.8 | <1–1 | 26–65 | 4–8 | 10–14 |

TABLE IX-continued

Self-fixing and heat-fixing of inventive developers containing wax, polyester binder, and various inventive crosslinked polymeric particles

| Identity of cross-linked polymeric particles (Example) | Toner image optical density | Oily abrasion-resistance (A–B) | | dry-abrasion resistance (A–B) | |
|---|---|---|---|---|---|
| | | self-fixed toner image | heat-fixed toner image | self-fixed toner image | heat-fixed toner image |
| Ex. 8 | 1.5 | 9–25 | 10–24 | 6–9 | 48–52 |
| Ex. 9 | 1.6 | 11–30 | 14–30 | 12–16 | 50–80 |

The results in Table IX show that all developers tested in this example produced good heat-fixed toner images and that all produced good self-fixed toner images, at least in terms of dry abrasion-resistance. The poor oily abrasion-resistance of self-fixed toner images produced by the developer containing particles of Example 4 (wherein crosslinking was 6%) is consistent with the results in Table III, Example 25, but such a developer is still useful in situations where self-fixed toner image contact with human skin is not contemplated, or where heat-fixing is used.

The following Examples illustrate the use of crosslinked polymeric particles of the invention in various layers of electrographic elements and records in accordance with the invention.

EXAMPLE 33

In this example, and in the following Example 34 crosslinked polymeric particles of the invention were used to form a protective uniform coating over toner images previously formed on the surface of an electrophotographic element.

Crosslinked polymeric particles of the invention, comprising poly(isobutyl methacrylate-co-2-ethylhexyl methacrylate-co-divinylbenzene) 72/25/3, were dispersed at a 10 weight percent concentration in Solvesso-100 TM.

The stabilizer polymer of Example 30 was dissolved at a 10 weight percent concentration in Solvesso-100 TM.

10 g of the 10% particle dispersion and 2.5 g of the 10% stabilizer solution were mixed to form a dispersion, that was then diluted to one liter with Isopar G TM and electrophoretically deposited over a toner image previously formed on Kodak Ektavolt SO101 TM recording film. The deposit was allowed to self-fix at room temperature and formed an abrasion-resistant transparent protective film over the toner image.

EXAMPLE 34

A dispersion in Isopar G TM was prepared as in Example 33, except that 5 g of a 10 weight percent dispersion of the polyethylene wax, Epolene E12 TM (Eastman Kodak Co.), and the wax-dispersant, poly(ethylene-co-vinyl acetate) 72/28, in Solvesso-100 TM was also included in the Isopar dispersion. The wax/wax-dispersant weight ratio was 1/1.

As in Example 33, the dispersion was electrophoretically deposited over a toner image and self-fixed. The protective film that formed over the toner image was even more abrasion-resistant than the film of Example 33.

EXAMPLE 35

In this example, a protective uniform coating of crosslinked particles of the invention over the untoned surface of a photoconductive layer of an electrophotographic element is illustrated and compared to a similar coating formed from uncrosslinked particles not in accordance with the invention.

Crosslinked polymeric particles of the invention, comprising poly(isobutyl methacrylate-co-2-ethylhexyl methacrylate-co-divinylbenzene) 81/15/4, were prepared as follows:

A reactor was prepared by dissolving 27.5 g of 40% active Alipal Co.-436 TM (an ammonium salt of a sulfate ester of an alkylphenoxypoly(ethyleneoxy)ethanol from GAF Corp) and 5.5 g of potassium persulfate in 1375 g of deoxygenated water. A head tank was prepared by first dissolving 27.5 g of 40% active Alipal Co.-436 TM and 5.5 g of potassium persulfate in 671 g of deoxygenated water. To the head tank solution was then added 891 g of isobutylmethacrylate, 165 g of 2-ethylhexyl methacrylate, and 80 g of 55% active divinylbenzene (44 g of difunctional monomer). The head tank contents were stirred to maintain a pre-emulsion. The reactor contents were heated to 90° C. The head tank contents were added to the reactor over 45 minutes. The reaction continued for 2.5 hours and then the product was cooled and filtered. The product was isolated by precipitation. The colloid was coagulated by the use of sodium chloride and the precipitate was washed with methanol/water (¼) four times. The purified polymer was dried in vacuo at 50° C. for 24 hours and dispersed in Isopar G TM /Solvesso-100 TM (3.25/1) to form a coating composition in accordance with the invention.

For comparison purposes, polymeric particles, not crosslinked and not in accordance with the invention, were prepared in a similar manner and comprised poly(isobutyl methacrylate-co-2-ethylhexyl methacrylate) 80/20. They were then dissolved in 1-nitropropane to form a coating composition not in accordance with the invention.

Both coating compositions were then coated at coverages of 0.807 g/m$^2$(0.075 g/ft$^2$) on separate areas of the untoned photoconductive surface of an electrophotographic element, comprising a photoconductive layer on a conductive paper substrate.

The electrophotographic element had been prepared as follows.

288 g of Elvacite 2045 TM (a poly(isobutyl methacrylate) from DuPont), 10.2 g of phthalic anhydride and 30.6 g of poly(vinyl chlorendate) were dissolved in 2218 g of n-propanol by use of magnetic stirring overnight. The next morning 3.6 g of 5N HCl was added to the solution and it was stirred for 15 minutes longer. After addition of the HCl, 0.239 g of the pyrylium dye

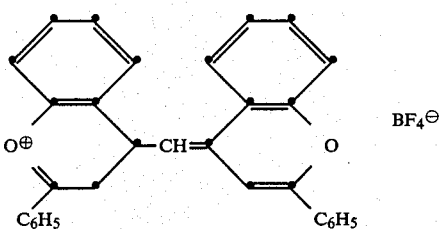

and 0.248 g of the dye 1,3-diethyl-2-[2-(2,3,4,5-tetraphenyl-3-pyrrolyl)vinyl]-1H-imidazo[4,5-b]quinoxalinium perchlorate, were stirred into the solution for 2 hours in darkness. Upon dissolution of the sensitizers, 1020 g of p-terphenyl were added to the solution and dispersed for 15 minutes. The mixture was then sand milled until the terphenyl particle size was reduced to 5 μm.

500 g of the above dispersion was let down with a solution comprising 18.8 g of Elvacite 2044 TM [a poly(butyl methacrylate) from DuPont] and 15.9 g of Elvacite 2045 TM dissolved in 864 g of n-propyl acetate, and the resultant dispersion was mixed for an additional 10 minutes. This final dispersion (16% solids) was extrusion hopper coated onto a conducting paper substrate. The p-terphenyl photoconductive layer had a dry coverage of 0.8 g/ft$^2$ (8.6 g/m$^2$).

Three separate areas of the surface of the photoconductive layer (an area with no overcoat, an area overcoated with the coating composition not in accordance with the invention, and an area overcoated with the inventive coating composition) were then charged, imagewise exposed, and developed with a typical electrographic liquid developer. After development, toner strain in the background (non-imaged) portions of the three separate areas was determined by measuring the optical reflection density of those background portions. Density in the unovercoated background portions was 0.23. Density in the background portions overcoated with the coating composition not in accordance with the invention was 0.25, i.e., even worse than the unovercoated portions. However, the background portions overcoated in accordance with the invention had a density of only 0.18, thus illustrating the utility of the inventive overcoat in reducing undesirable background toner stain.

EXAMPLE 36

In this example the utility of crosslinked particles of the invention in forming an electrical barrier layer in an electrophotographic element is illustrated.

An electrophotographic element was prepared by coating a barrier layer of crosslinked polymeric particles of the invention, comprising poly(isobutyl methacrylate-co-2-ethylhexyl methacrylate-co-divinylbenzene) 73/25/2, from a dispersion thereof in heptane, over a cuprous iodide conductive layer, and then coating an organic photoconductor layer over the barrier layer.

The element was charged uniformly to −600 volts and used successfully for electrophotographic imaging. The amount of dark decay was also measured and found to be very low (<2 volts/sec.), thus illustrating the utility of the inventive crosslinked polymeric particles as electrical barrier materials.

The invention has been described in detail with particular reference to certain preferred embodiments thereof. However, it should be appreciated that variations and modifications can be effected within the spirit and scope of the invention.

What is claimed is:

1. A plurality of polymeric particles, each particle having an average diameter less than one micrometer and comprising a crosslinked vinyl addition copolymer obtainable by aqueous emulsion polymerization of a mixture of monomers wherein:

1.5–15 percent by weight of the mixture of monomers comprises polyfunctional vinyl addition-polymerizable monomers in order to form crosslinking structural units in the copolymer;

85–98.5 percent by weight of the mixture of monomers comprises monofunctional vinyl addition-polymerizable monomers selected such that:

A. 0–98.5 percent by weight of the mixture of monomers comprises monofunctional monomers, the homopolymers of which would be insoluble in but swellable by an isoparaffinic hydrocarbon liquid;

B. From 0 to less than 85 percent by weight of the mixture of monomers comprises monofunctional monomers, the homopolymers of which would be soluble in the isoparaffinic hydrocarbon liquid; and C. 0–60 percent by weight of the mixture of monomers comprises monofunctional monomers, the homopolymers of which would be insoluble in and not swellable by the isoparaffinic hydrocarbon liquid;

with the provisos that:

I. if more than 0 percent by weight of the mixture of monomers comprises the monomers of part C., above, then more than 0 percent by weight of the mixture of monomers comprises the monomers of part B., above;

II. if more than 9 percent by weight of the mixture of monomers comprises the monomers of part C., above, then less than 10 percent by weight of the mixture of monomers comprises the monomers of part A., above; and III. all of the polyfunctional and monofunctional monomers and amounts thereof are selected such that the copolymer would be insoluble in the isoparaffinic hydrocarbon liquid but would be swellable in that liquid.

2. The polymeric particles of claim 1, wherein:
   2–7 percent by weight of the mixture of monomers comprises the polyfunctional vinyl addition-polymerizable monomers;
   from 0 to less than 10 percent by weight of the mixture of monomers comprises the monomers of part A of claim 1;
   25–60 percent by weight of the mixture of monomers comprises the monomers of part B of claim 1; and
   30–60 percent by weight of the mixture of monomers comprises the monomers of part C of claim 1.

3. The polymeric particles of claim 1, wherein:
   2–7 percent by weight of the mixture of monomers comprises the polyfunctional vinyl addition-polymerizable monomers;
   48–93 percent by weight of the mixture of monomers comprises the monomers of part A of claim 1;
   5–50 percent by weight of the mixture of monomers comprises the monomers of part B of claim 1; and
   0–9 percent by weight of the mixture of monomers comprises the monomers of part C of claim 1.

4. The polymeric particles of claim 1, wherein:

2-5 percent by weight of the mixture of monomers comprises the polyfunctional vinyl addition-polymerizable monomers;

58-90 percent by weight of the mixture of monomers comprises the monomers of part A of claim 1;

8-40 percent by weight of the mixture of monomers comprises the monomers of part B of claim 1; and 0-9 percent by weight of the mixture of monomers comprises the monomers of part C of claim 1.

5. The polymeric particles of claim 1, wherein:

the monomers of part A of claim 1 are selected from:

alkyl acrylates, alkyl methacrylates, and vinyl alkanecarboxylates, the alkyl and alkane groups of which contain 4 to 7 carbon atoms; and styrenes having one or more alkyl substituents containing a total of 1 to 3 carbon atoms;

the monomers of part B of claim 1 are selected from:

alkyl acrylates, alkyl methacrylates, and vinyl alkanecarboxylates, the alkyl and alkane groups of which contain at least 8 carbon atoms; styrenes having an alkyl substituent containing at least 4 carbon atoms; and olefinic hydrocarbons; and the monomers of part C of claim 1 are selected from:

styrene; styrenes having an electronegative substituent; alkyl acrylates, alkyl methacrylates, and vinyl alkanecarboxylates, the alkyl and alkane groups of which contain less than 4 carbon atoms; nitriles; and acrylic and styrene monomers having a hydroxy, amido, amino, or quaternary ammonium substituent.

6. The polymeric particles of claim 1, wherein the polyfunctional vinyl addition-polymerizable monomers are chosen from divinylbenzene, ethylene dimethacrylate, ethylene diacrylate, and N,N'methylenebisacrylamide.

7. The polymeric particles of claim 1, comprising a copolymer of divinylbenzene, isobutyl methacrylate, and either 2-ethylhexyl methacrylate or n-lauryl methacrylate.

8. The polymeric particles of claim 1, wherein the glass transition temperature of the particles when not in contact with a liquid is higher than ambient temperature, but wherein the glass transition temperature of the particles would be lower than ambient temperature if they were swollen with the isoparaffinic hydrocarbon liquid.

9. The polymeric particles of claim 1, wherein each particle has an average diameter less than 0.2 micrometer.

10. The polymeric particles of claim 1, wherein each particle has an average diameter of from 0.02 to 0.1 micrometer.

11. The polymeric particles of claim 1, further comprising a colorant mixed with or bonded to the copolymer.

12. A coating composition comprising the polymeric particles of claim 1 dispersed in a liquid.

13. A composition comprising a dispersion of the polymeric particles of claim 1 in a non-aqueous organic liquid.

14. A liquid electrographic developer comprising a dispersion of the particles of claim 1 in an electrically insulating organic liquid.

15. The liquid electrographic developer of claim 14, further comprising a polymeric dispersion stabilizer and charging agent dispersed or dissolved in the electrically insulating organic liquid.

16. The liquid electrographic developer of claim 14, further comprising a wax dispersed in the electrically insulating organic liquid.

17. The liquid electrographic developer of claim 16, further comprising a dispersing agent for the wax.

18. The liquid electrographic developer of claim 14, further comprising a polyester binder dispersed in the electrically insulating organic liquid.

19. The liquid electrographic developer of claim 18, wherein the polyester binder comprises polyester particles containing a colorant.

20. The liquid electrographic developer of claim 19, wherein the colorant has been combined with the polyester binder by melt-blending.

21. The liquid electrographic developer of claim 18, wherein the polyester binder comprises polyester particles containing a wax.

22. The liquid electrographic developer of claim 19, wherein the wax has been combined with the polyester binder by melt-blending.

23. A self-fixable liquid electrographic developer comprising the particles of claim 8 dispersed in and swollen with the isoparaffinic hydrocarbon liquid.

24. An electrographic record comprising an electrographic toner image on a substrate, characterized in that the toner image comprises the particles of claim 1.

25. An electrographic record comprising:

a substrate;

an electrographic toner image on the substrate; and over the toner image and the substrate, a polymeric layer comprising the particles of claim 1.

26. An electrographic element comprising:

an electrically conductive substrate;

a photoconductive layer; and a coating on the photoconductive layer comprising the polymeric particles of claim 1.

27. An electrophotographic element comprising:

an electrically conductive substrate;

a photoconductive layer; and a barrier layer comprising the polymeric particles of claim 1 situated between the substrate and the photoconductive layer.

* * * * *